United States Patent Office 3,743,521
Patented July 3, 1973

3,743,521
COATED FIBROUS SAUSAGE CASING
Jerome J. M. Rasmussen, South Stickney Township, Ill., assignor to Union Carbide Corporation, New York, N.Y.
No Drawing. Filed Oct. 6, 1970, Ser. No. 78,600
Int. Cl. A22c *13/00*
U.S. Cl. 99—176                    4 Claims

ABSTRACT OF THE DISCLOSURE

A fibrous sausage casing particularly suited for use with sausage of the moist type, such as liver sausage, has an internal coating of a cationic thermosetting resin and an exterior coating of a vinylidene resin. The casing inhibits the accumulation of fat and/or gelatin between the sausage and the casing despite instability of the sausage emulsion.

---

This invention relates to sausage casing and refers more particularly to an improved coated casing of the type referred to in the art as "fibrous casing."

The manufacture of sausage is among the oldest of the food preparation arts. There are a large number of different types of sausage manufactured throughout the world and a vastly greater number of sausage makers. Each sausage maker may have his own recipe for the sausage he produces, and these recipes differ to suit different tastes and regional preferences. Despite the proliferation of sausage recipes, they may be grouped into a much smaller list of categories.

One category of sausages is generally referred to as "dry sausage" or "summer sausage." As the name suggests, this type of sausage is dry, and its manufacture includes drying as a principal step. It has a low fat content. Depending on the particular type, dry sausage may be smoked. Cooking is accomplished in some types of smoked, dry sausage during the smoking step. Another category of sausage is typified by liver sausage. This type of sausage is moist and much softer than dry sausage. It has a substantially higher fat content than does dry sausage. It is cooked, usually in steam, by the manufacturer.

A common feature of most categories of sausage is that the mixture of comminuted meat, spices, and seasoning of which the sausage is made up, commonly called the "emulsion" is stuffed into a casing. Processing of the sausage is conducted while it is encased, and the finished product is stored in the casing. Although casings originally were natural materials such as animal intestines and such materials are still used, the modern trend is to employ synthetic casings. Different categories of sausage require different types of casing. For the two categories of sausage discussed above it is common to utilize a type of casing generally referred to as "fibrous." Fibrous casing consists of a fibrous web, usually a paper, formed and seamed into a tube, impregnated with viscose which is regenerated in situ.

Since there are so many differences in recipes for making sausage and such different modes of processing different types of sausage, it is difficult to provide a casing that is universally acceptable for all uses. For example, in the production of dry sausage, the principal step, as indicated above, is curing by drying. This curing step generally requires a protracted period of time, for example one to six months. In the drying step, moisture must be removed, and it must escape through the wall of the casing. Since smoking is usually a corollary step in the production of this type of sausage, the casing must be permeable to smoke, so that the smoke is accessible to the sausage. Furthermore, in drying the sausage shrinks substantially, and the casing must adhere to it and shrink with the meat mass as it dries.

On the other hand, in the production of the second category of sausage above discussed, the liver or moist type, moisture must be retained within the emulsion. Further the emulsion must be protected against oxidation which causes undesirable discoloration of the sausage. Thus, the casing should be substantially impermeable to moisture and should have a low rate of oxygen transmission.

Fibrous casings especially produced as to be suitable for each of the two categories of sausage are available commercially. For the dry sausage a fibrous casing having a coating of a cationic, thermosetting resin on the surface of the casing to be in contact with the emulsion has been produced. Such a casing is described in U.S. Pat. No. 3,378,379. It permits passage of moisture from the emulsion during drying, ingress of smoke to the emulsion during smoking, and adheres well to the emulsion and shrinks as the emusion shrinks.

Similarly, fibrous casings are available with moisture proof coatings for use in the production and storage of the moist type of sausage. Such casings have a coating of a material such as polyvinylidene chloride. The coating is substantially moisture proof and has a low oxygen transmission. A casing of this type is described in U.S. Pat. No. 2,961,323. Usually it is used with the moisture proof coating on the outside, but some sausage makers, particularly in Europe, prefer to have the moisture proof coating in contact with the emulsion.

Although such moisture proof casings are entirely satisfactory in performing their intended function in preventing moisture and weight loss during processing of emulsions stuffed in them and in preventing oxidation of the processed sausage on storage, problems still exist for the maker of the sausage type for which this type of casing is best suited. These problems are attributable to differences in recipe for the sausage or to less than optimum preparation or to both. They are evidenced by the accumulation of pockets of fat or gelatin between the casing wall and the sausage along the length of the sausage and at its ends. These accumulations or pockets not only are unsightly but also detract from the flavor of the product and may lead to premature spoilage of the product. Their formation is most likely if the emulsion used is higher in fat or collagen respectively than usual, or if the necessary blending of the ingredients to produce a stable emulsion is not attained. In any event the phenomenon presents a serious problem to the sausage maker.

One approach to the problem of course is to improve emulsion ingredient quality and the chopping, blending and processing techniques, but even under the best conditions some fat separation and gelatin accumulation are frequently encountered. An expedient designed to alleviate the effect of the problem is so-called "pre-sticking" of the casing, the provision in the casing wall of a number of small perforations. This obviously is really no solution to the problem but it does permit escape of some of the fat and gelatin at the expense of destroying to some extent the moisture proof and low oxygen transmission qualities of the casing.

It is the principal object of this invention to provide a fibrous sausage casing suited for use in the processing and storage of moist liver-type sausage which inhibits the formation of accumulations of fat and/or gelatin pockets between the sausage and the casing wall.

The invention by means of which this object is attained comprises a fibrous causing having bonded on its outside surface a moisture proof coating of a vinylidene resin and on its inside surface to be in contact with the sausage a coating of a cationic thermosetting resin which coating is insoluble in water. The invention is based upon the surprising discovery that a coating of the type described on the inside surface of a fibrous sausage casing prevents the formation of fat and/or gelatin pockets between the casing and sausage meat even under conditions normally conducive to the release of fat and gelatin from the sausage emulsion.

The internal coating for the casing of the invention is a cationic thermosetting resin of the type which is originally water-soluble or water-dispersible and is insoluble in water when dried and cured. Examples of such materials are the reaction product of epichlorohydrin and polyamide, for instance such as described in U.S. Pat. No. 2,926,154, a modified melamine and formaldehyde composition such as that described in U.S. Pat. No. 2,796,362, and a modified urea and formaldehyde resin, for instance of the type described in U.S. Pat. No. 2,616,874. Other useful materials for the purpose are described in U.S. Patent No. 3,378,379 referred to above. A preferred material is the epichlorohydrin-polyamide resin there described. The external coating of the casing of the invention is vinylidene resin of the type described in U.S. Patent No. 2,961,323 and contains at least 5% vinylidene chloride in the molecule. A preferred material is a polyvinylidene chloride resin.

To produce the casing of the invention, fibrous casing prepared in the usual way is interiorly coated for instance by the "slugging" technique described in U.S. Patent No. 3,378,379 with an aqueous solution of the selected cationic thermosetting resin. For example a solution containing about 0.05% by weight of epichlorohydrin-polyamide resin may be used, introducing the solution to the interior of the casing before it is dried. The casing is then dried, and the resin is cured during drying. The dried, internally coated casing may be flattened and reeled and then exteriorily coated. The exterior coating of vinylidene resin is applied in the manner described in U.S. Pat No. 2,961,323. There the casing is inflated and passed through a reservoir of liquid vinylidene resin to apply a coating of liquid resin to the casing. The thickness of the layer of resin is adjusted by conventional means and the coating is dried. Then high temperature is applied to the coating to coalesce and "sinter" it to form a coherent, continuous coating securely bonded to the casing.

A substantial quantity of casing embodying the invention has been made as described to determine its suitability. A coating of epichlorohydrin-polyamide resin was applied to the interior of fibrous casing of about three inch diameter just after extrusion by introducing an aqueous solution containing about 0.05% by weight of the resin. The casing was dried in inflated condition to a moisture content of about 2% to 4%. The dried tubing was reinflated and coated with a polyvinylidene chloride latex containing 36% solids. The coating was dried and the casing was heated to fuse the coating and to provide a uniform layer.

The casing so produced was used to conduct a number of tests in comparison with casing with no coating, casing with moisture proof coating only and casing with internal coating only. Three different emulsion recipes were prepared, one a generally accepted standard, stable emulsion, one high in fat, and one high in collagen. In one series of tests a total of 48 sausages was produced, four samples of each type of casing being produced with each of the three types of emulsion. The sausages weighed 3 to 4 pounds, had a diameter of about three inches and a length of about 12 to 14 inches. The preparation of emulsion, the stuffing operations and processing were all conducted in accordance with standard commercial practice.

The compositions of the three emulsions used are tabulated below. Prague powder is a commercial blend of curing materials.

|  | I | I | III |
|---|---|---|---|
| Pork liver, pounds | 25 | 20 | 20 |
| Pork trimmings (50% fat), pounds | 25 | 30 | 20 |
| Scalded beef tripe, pounds | Nil | Nil | 10 |
| Salt, pounds | 1.5 | 1.5 | 1.5 |
| Spice, ounces | 6 | 6 | 6 |
| Prague powder, ounces | 2 | 2 | 2 |

It will be apparent from the above that emulsion II was higher in fat than emulsion I by reason of the larger quantity of pork trimmings used, and that emulsion III is higher in collagen than emulsions I and II, the collagen being derived from the beef tripe present in emulsion III. The emulsions were prepared in conventional manner as stated above, the liver and spice being comminuted in a silent cutter, the pork trimming then being added and the entire mass than being chopped and minced; the temperature of the mass being about 64° F. at this point. The emulsions were then stuffed into the casings utilizing a commercial stuffer of the piston type.

The sausages so produced were then cooked by heating in water at 160° F. until an internal temperature of 148° F. was obtained. After cooking, the sausages were showered with cold water and were placed under refrigeration. All had a uniformly light pink color, the sausages of emulsion II and emulsion III being somewhat lighter than those of emulsion I. After an hour all sausages enclosed in casings without the moisture proof coating showed discoloration, some yellowish brown streaks appearing. This color change is taken as evidence of oxidation of the emulsion. In a matter of days discoloration had progressed to the point where a relatively uniform dark brown was evident over the entire surface of every sausage encased in casing having no moisture proof coating. Slicing of the sausages showed progressive discoloration into the interior portions of the sausage. However, no sausage encased in casing having a moisture proof coating showed any discoloration after a week.

Observation also showed the formation of pockets of fat in sausages made of emulsion II and pockets of fat and gelatin in sausages of emulsion III in every instance where the casing used did not have an internal coating of resin.

The only sausages which were satisfactory from the standpoint of lack of discoloration and lack of fat and/or gelatin accumulations between the meat and the casing wall were those embodying the invention, that is those having both the external moisture proof coating and the internal resin coating.

On the basis of these and other tests it is concluded that the invention provides a satisfactory solution to the problem of fat and gelatin accumulation in sausages of the liver sausage type.

I claim:

1. A tubular fibrous sausage casing characterized as being suitable for use in processing and storing sausage of the liver sausage type, which casing has on its exterior surface an amount of a moisture proof layer of a vinylidene resin containing at least 5% vinylidene chloride in the molecule, sufficient to substantially reduce the loss of moisture from and oxidation of a product processed and stored therein and on its inner surface an amount of a coating of a water-insoluble cationic thermosetting resin sufficient to substantially eliminate the accumulation of fat and jelly pockets on the surface of a product processed and stored therein.

2. A sausage casing as defined by claim 1 in which said vinylidene resin coating is a polyvinylidene chloride resin.
3. A sausage casing as defined by claim 1 in which said interior coating is epichlorohydrin-polyamide resin.
4. A sausage casing as defined by claim 3 in which said exterior coating is a polyvinylidene chloride resin.

References Cited

UNITED STATES PATENTS

| | | | |
|---|---|---|---|
| 2,201,457 | 5/1940 | Smith | 99—176 |
| 2,326,899 | 8/1943 | Thinius | 99—176 |
| 2,866,710 | 12/1958 | Dowd | 99—176 |
| 2,952,550 | 9/1960 | Parlour | 99—176 |
| 2,961,323 | 11/1960 | Underwood | 99—176 |
| 3,378,379 | 4/1968 | Shiner | 99—176 |

FOREIGN PATENTS

| | | | |
|---|---|---|---|
| 650,935 | 10/1962 | Canada | 117—68 |
| 790,201 | 6/1956 | Great Britain | 99—171 CA |
| 1,101,117 | 3/1961 | Germany | 99—176 |

FRANK W. LUTTER, Primary Examiner

R. HALPER, Assistant Examiner

U.S. Cl. X.R.

99—171 CA; 117—68